United States Patent
Gupta et al.

(10) Patent No.: US 11,379,226 B2
(45) Date of Patent: Jul. 5, 2022

(54) MISSION-BASED DEVELOPER CERTIFICATION SYSTEM AND METHOD

(71) Applicant: ServiceNow, Inc., Santa Clara, CA (US)

(72) Inventors: Sanjay Kumar Gupta, Saratoga, CA (US); Sarup Paul, Pleasanton, CA (US); Harish Kumar Balachandra Bellamane, San Jose, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/995,526

(22) Filed: Aug. 17, 2020

(65) Prior Publication Data
US 2020/0379756 A1    Dec. 3, 2020

Related U.S. Application Data

(63) Continuation of application No. 16/006,567, filed on Jun. 12, 2018, now Pat. No. 10,747,530.

(51) Int. Cl.
*G06F 9/44*      (2018.01)
*G06F 9/455*    (2018.01)
(Continued)

(52) U.S. Cl.
CPC .......... *G06F 8/77* (2013.01); *G06F 16/24578* (2019.01)

(58) Field of Classification Search
CPC ............................ G06F 8/77; G06F 16/24578
See application file for complete search history.

(56) References Cited

U.S. PATENT DOCUMENTS 6,321,229 B1   11/2001   Goldman
6,678,887 B1    1/2004   Hallman
(Continued)

OTHER PUBLICATIONS

Afrina Khatun, A Bug Assignment Technique Based on Bug Fixing Expertise and Source Commit Recency of Developers, 2016, pp. 592-597. https://ieeexplore.ieee.org/stamp/stamp.jsp?tp=&arnumber=7860265&isnumber=7860155 (Year: 2016).*

(Continued)

*Primary Examiner* — Mongbao Nguyen
(74) *Attorney, Agent, or Firm* — Fletcher Yoder PC

(57) ABSTRACT

The present disclosure relates to enabling clients to identify qualified developers for software development projects. An example method of operating a developer exchange server includes updating stored progress of developers for mission-related activities, wherein the mission-related activities correspond to features of a software platform, and determining, based on the stored progress of each of the developers, a confidence score for each of the developers for each of the features. The method includes receiving a search request that indicates a subset of the features and corresponding confidence thresholds for each of the subset of features, and in response, determining a ranked listing of qualified developers based on the subset of the features, the corresponding confidence thresholds, and the respective confidence score of each of the developers for each of the subset of features. The method further includes providing the ranked listing of qualified developers in response to the search request.

14 Claims, 9 Drawing Sheets

(51) Int. Cl.
  *G06F 9/445* (2018.01)
  *G06F 8/77* (2018.01)
  *G06F 16/2457* (2019.01)

(56) References Cited

U.S. PATENT DOCUMENTS

| | | | |
|---|---|---|---|
| 6,799,189 | B2 | 9/2004 | Huxoll |
| 6,816,898 | B1 | 11/2004 | Scarpelli |
| 6,895,586 | B1 | 5/2005 | Brasher |
| 7,020,706 | B2 | 3/2006 | Cates |
| 7,027,411 | B1 | 4/2006 | Pulsipher |
| 7,392,300 | B2 | 6/2008 | Anantharangachar |
| 7,617,073 | B2 | 11/2009 | Trinon |
| 7,685,167 | B2 | 3/2010 | Mueller |
| 7,716,353 | B2 | 5/2010 | Golovinsky |
| 7,769,718 | B2 | 8/2010 | Murley |
| 7,925,981 | B2 | 4/2011 | Pourheidar |
| 7,933,927 | B2 | 4/2011 | Dee |
| 7,945,860 | B2 | 5/2011 | Vambenepe |
| 8,082,222 | B2 | 12/2011 | Rangarajan |
| 8,380,645 | B2 | 2/2013 | Kowalski |
| 8,402,127 | B2 | 3/2013 | Solin |
| 8,499,278 | B2* | 7/2013 | Hughes ............... G06Q 40/12 717/101 |
| 8,554,750 | B2 | 10/2013 | Rangaranjan |
| 8,612,408 | B2 | 12/2013 | Trinon |
| 8,646,093 | B2 | 2/2014 | Myers |
| 8,745,040 | B2 | 6/2014 | Kowalski |
| 8,812,539 | B2 | 8/2014 | Milousheff |
| 8,818,994 | B2 | 8/2014 | Kowalski |
| 8,832,652 | B2 | 9/2014 | Mueller |
| 9,015,188 | B2 | 4/2015 | Behne |
| 9,037,536 | B2 | 5/2015 | Vos |
| 9,098,322 | B2 | 8/2015 | Apte |
| 9,137,115 | B2 | 9/2015 | Mayfield |
| 9,305,279 | B1 | 4/2016 | Menzel |
| 9,317,327 | B2 | 4/2016 | Apte |
| 9,323,801 | B2 | 4/2016 | Morozov |
| 9,363,252 | B2 | 6/2016 | Mueller |
| 9,412,084 | B2 | 9/2016 | Kowalski |
| 9,467,344 | B2 | 10/2016 | Gere |
| 9,557,969 | B2 | 1/2017 | Sharma |
| 9,613,070 | B2 | 4/2017 | Kumar |
| 9,645,817 | B1 | 5/2017 | van Schaik |
| 9,645,833 | B2 | 5/2017 | Mueller |
| 9,654,473 | B2 | 5/2017 | Miller |
| 9,659,051 | B2 | 5/2017 | Hutchins |
| 9,766,935 | B2 | 9/2017 | Kelkar |
| 9,785,421 | B1 | 10/2017 | Neatherway |
| 9,785,432 | B1 | 10/2017 | Wright |
| 9,792,387 | B2 | 10/2017 | George |
| 9,798,648 | B2 | 10/2017 | Henriksen |
| 9,805,322 | B2 | 10/2017 | Kelkar |
| 9,852,165 | B2 | 12/2017 | Morozov |
| 9,911,413 | B1 | 3/2018 | Kumar |
| 10,002,203 | B2 | 6/2018 | George |
| 2009/0182757 | A1* | 7/2009 | Lotlikar ............... G06Q 30/02 |
| 2011/0055207 | A1 | 3/2011 | Schorzman |
| 2011/0276396 | A1* | 11/2011 | Rathod ............... H04W 4/60 707/706 |
| 2013/0171594 | A1* | 7/2013 | Gorman ............... G09B 5/00 434/219 |
| 2014/0137074 | A1 | 5/2014 | Hey |
| 2014/0165027 | A1* | 6/2014 | Herbert ......... G06Q 10/063112 717/101 |
| 2014/0298286 | A1 | 10/2014 | Howard |
| 2015/0019204 | A1 | 1/2015 | Simard |
| 2015/0309790 | A1 | 10/2015 | Henriksen |
| 2016/0179501 | A1 | 6/2016 | Briggs |
| 2016/0179805 | A1 | 6/2016 | Bolshinsky |
| 2016/0196534 | A1 | 7/2016 | Jarrett |
| 2016/0196543 | A1 | 7/2016 | Miyakoshi |
| 2017/0163631 | A1 | 6/2017 | Brucker |
| 2017/0337202 | A1* | 11/2017 | Arya ............... G06N 20/00 |
| 2017/0371626 | A1 | 12/2017 | Abebe |
| 2018/0081683 | A1 | 3/2018 | Shuster |
| 2018/0129483 | A1* | 5/2018 | Biddle ............... G06F 8/77 |
| 2018/0150571 | A1 | 5/2018 | Douglas |
| 2018/0239829 | A1* | 8/2018 | Dialani ............... G06Q 50/01 |
| 2018/0260193 | A1 | 9/2018 | Polisky |
| 2018/0300127 | A1 | 10/2018 | Wright |
| 2019/0034795 | A1* | 1/2019 | Zitouni ............ G06F 16/90335 |
| 2019/0129714 | A1 | 5/2019 | Wright |
| 2019/0197487 | A1 | 6/2019 | Jersin |
| 2019/0236106 | A1* | 8/2019 | Zhang ............ G06F 16/90335 |
| 2019/0258722 | A1* | 8/2019 | Guo ............... G06N 3/0454 |
| 2019/0287040 | A1* | 9/2019 | Cohen ............ G06Q 10/06398 |
| 2019/0303798 | A1 | 10/2019 | Xie |
| 2019/0317760 | A1 | 10/2019 | Kessentini |
| 2019/0332366 | A1* | 10/2019 | Natanzon ............... G06F 8/60 |
| 2019/0347585 | A1 | 11/2019 | Mowatt |

OTHER PUBLICATIONS

Jifeng Xuan, Developer Prioritization in Bug Repositories, 2017, pp. 1-12. https://arxiv.org/ftp/arxiv/papers/1704/1704.04764.pdf (Year: 2017).*

Motahareh Bahrami Zanjani, Using Developer-Interaction Trails to Triage Change Requests, 2015, pp. 88-97. https://ieeexplore.ieee.org/stamp/stamp.jsp?tp=&arnumber=7180070 (Year: 2015).*

Ali Sajedi Badashian, Realistic Bug Triaging, 2016, pp. 847-850 https://ieeexplore.ieee.org/stamp/stamp.jsp?tp=&arnumber=7883418&isnumber=7883261 (Year 2016).

Eleni Constantinou, Identifying Developers' Expertise in Social Coding Platforms, 2016, pp. 63-67. https //ieeexplore .ieee .org/stamp/stamp.jsp?tp=&arnumber=7 592778&isnumber= 7 5927 57 (Year 2016).

Ke Mao, Developer Recommendation for Crowdsourced Software Development Tasks, 2015, pp. 347-355. https://ieeexplore.ieee.org/stamp/stamp.jsp?tp=&arnumber=7133552 (Year 2015).

Jiangang Zhu, A Learning to Rank Framework for Developer Recommendation in Software Crowdsourcing, 2015, pp. 285-292. https://ieeexplore.ieee.org/stamp/stamp.jsp?tp=&arnumber=7467312 (Year: 2015).

* cited by examiner

MISSION-BASED DEVELOPER CERTIFICATION SYSTEM AND METHOD

CROSS REFERENCE TO RELATED APPLICATION(S)

This application is a continuation of U.S. patent application Ser. No. 16/006,567, filed Jun. 12, 2018, the content of which is incorporated herein in its entirety by reference.

BACKGROUND

The present disclosure relates generally to software development and, more specifically, to enabling clients to identify qualified developers for software development projects.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions.

Over the life of a software platform that supports such services, new versions may be created including new features that were not present in previous releases. New features may, for example, be designed to add new functionality, improve stability, or reduced resource consumption during operation. When a new feature is added to a software release, there is typically a relatively slow increase in developer usage of the feature until these developers become familiarized and comfortable implementing the feature. As such, it is presently recognized that it is desirable reduce the delay in developer acceptance and integration of these features to improve operation of the system.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed toward a mission-based method of improving awareness and implementation of new features of a software platform. More specifically, present embodiments are directed toward a developer exchange system that tracks and stores developer progress through a number of mission-related activities that are designed to educate and inform the developer regarding features of a software platform. The disclosed developer exchange system is capable of determining a confidence score for each developer/feature combination based on, for example, an amount of each activity that was completed by the developer and a relative weighting of each activity toward completion of a mission directed to the feature. Furthermore, the disclosed developer exchange system enables clients to submit search requests that indicate one or more features and one or more confidence thresholds that correspond to these features. In response, the disclosed developer exchange system is designed to determine and provide a ranked listing of qualified (e.g., proficient, expert) developers based on the indicated search parameters and the stored developer progress with respect to the mission-related activities. Accordingly, the disclosed developer exchange system reduces delay in developer acceptance and usage of new features, while also enabling clients to locate competent developers based on the particular software development requirements of the client.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
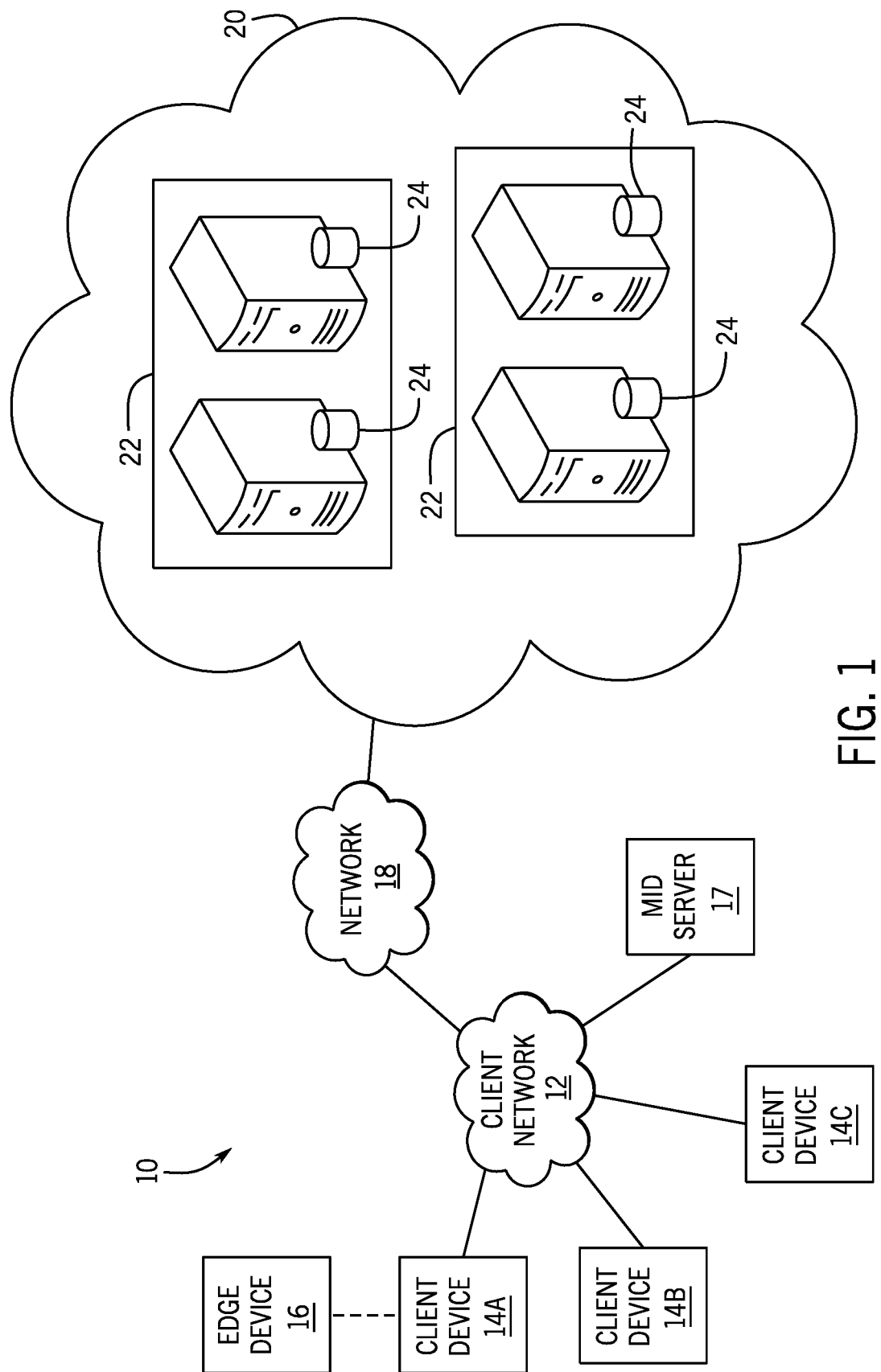
FIG. 1 is a block diagram of an embodiment of a cloud computing system in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

As used herein, the term "software platform" or "platform" refers to a collection of applications executed by a computing system to support one or more clients. As used herein, the term "release feature" or "new feature" generally refers to functionality that is present in a newer version of a platform and that was not present in a former version of the platform. As used herein, a "mission" refers to a group of one or more activities that are associated with training a developer to use a particular feature. As used herein, an "activity" refers to a group of one or more actions (e.g., reading documentation, watching instructional videos, producing coding examples) that are performed by a developer as part of completing one or more missions. As used herein, a "developer" is a programmer or group of programmers that builds (e.g., designs, codes) applications on behalf of a client to operate on the platform.

Present embodiments are directed toward improving awareness and implementation of new feature of a software platform release. As discussed above, new features may, for example, be designed to add new functionality, improve stability, or reduced resource consumption during operation, and as such, it is desirable to make both clients and developers aware of such new features to encourage their usage. However, in the absence of the present disclosure, there is not a system capable of determining suitable developers for a client to engage to develop an application involving particular new features of the updated software platform.

With the foregoing in mind, present embodiments include a mission-based system and method for providing training activities to developers and tracking the progress of developers through these activities. Additionally, the disclosed system is capable of determining a confidence score for each developer/feature combination based on, for example, an amount of each activity completed by the developer and a relative weight of the activity with respect to a mission directed to the feature. Furthermore, the disclosed system enables clients to submit search requests based on one or more features and one or more corresponding confidence thresholds, and to receive, in response, a ranked listing of qualified developers. Accordingly, the disclosed system facilitates the training of developers, as well as connecting clients with competent developers, based on the particular software development needs of the client. As such, the disclosed system can improve overall client and developer awareness of release features, and encourage implementation of these release features.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, where embodiments of the present disclosure may operate, is illustrated. Computing system 10 may include a client network 12, network 18 (e.g., the Internet), and a cloud-based platform 20. In some implementations, the cloud-based platform may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the platform 20. FIG. 1 also illustrates that the client network 12 includes an administration or managerial device or server, such as a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), IEEE 802.11 networks, and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-C via the client network 12 and network 18. The network hosting the platform 20 provides additional computing resources to the client devices 14A-C and/or client network 12. For example, by utilizing the network hosting the platform 20, users of client devices 14A-C are able to build and execute applications for various enterprise, IT, and/or other organization-related functions. In one embodiment, the network hosting the platform 20 is implemented on one or more data centers 22, where each data center could correspond to a different geographic location. Each of the data centers 22 includes a plurality of virtual servers 24 (also referred to herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary web server installation), an application server (e.g., a unitary JAVA Virtual Machine), and/or a database server, e.g., a unitary relational database management system (RDBMS) catalog.

To utilize computing resources within the platform 20, network operators may choose to configure the data centers 22 using a variety of computing infrastructures. In one embodiment, one or more of the data centers 22 are configured using a multi-tenant cloud architecture, such that one of the server instances 24 handles requests from and serves multiple customers. Data centers with multi-tenant cloud architecture commingle and store data from multiple customers, where multiple customer instances are assigned to one of the virtual servers 24. In a multi-tenant cloud architecture, the particular virtual server 24 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 24 causing outages for all customers allocated to the particular server instance.

In another embodiment, one or more of the data centers 22 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
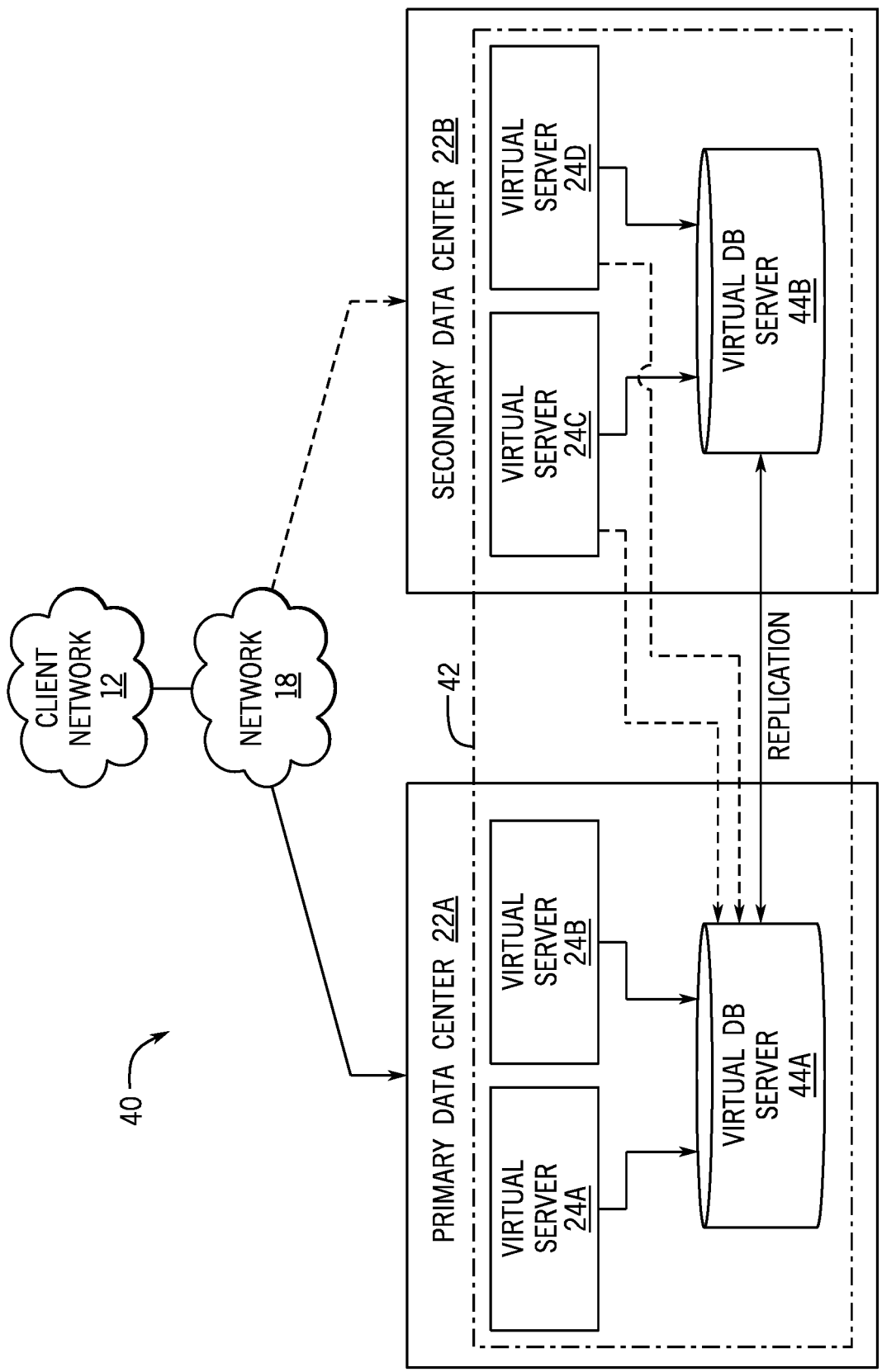
FIG. 2 is a block diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a simply client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances and are specific to the respective client instance 42. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

In the depicted example, to facilitate availability of the client instance 42, the virtual servers 24A-24D and virtual database servers 44A and 44B are allocated to two different data centers 22A and 22B, where one of the data centers 22 acts as a backup data center. In reference to FIG. 2, data center 22A acts as a primary data center that includes a primary pair of virtual servers 24A and 24B and the primary virtual database server 44A associated with the client instance 42. Data center 22B acts as a secondary data center 22B to back up the primary data center 22A for the client instance 42. To back up the primary data center 22A for the client instance 42, the secondary data center 22B includes a secondary pair of virtual servers 24C and 24D and a secondary virtual database server 44B. The primary virtual database server 44A is able to replicate data to the secondary virtual database server 44B (e.g., via the network 18).

As shown in FIG. 2, the primary virtual database server 44A may back up data to the secondary virtual database server 44B using a database replication operation. The replication of data between data could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the second data center 22B during a failure and/or maintenance scenario. Using FIG. 2 as an example, if the virtual servers 24A and 24B and/or primary virtual database server 44A fails and/or is under maintenance, data traffic for client instances 42 can be diverted to the secondary virtual servers 24C and/or 24D and the secondary virtual database server instance 44B for processing.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 24A-D and virtual database servers 44A and 44B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
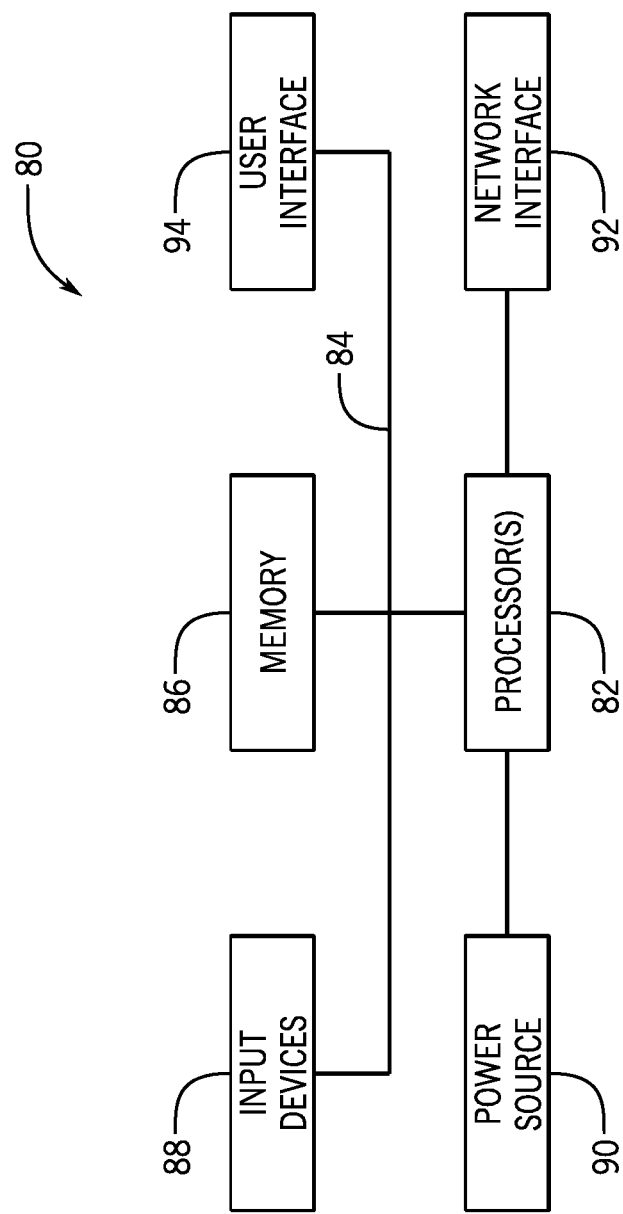
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 includes suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processor 82. For example, the input devices 88 may include a mouse, touchpad, touchscreen, keyboard and the like. The power source 90 can be any suitable source for power of the various components of the computing device 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

Figure 4:
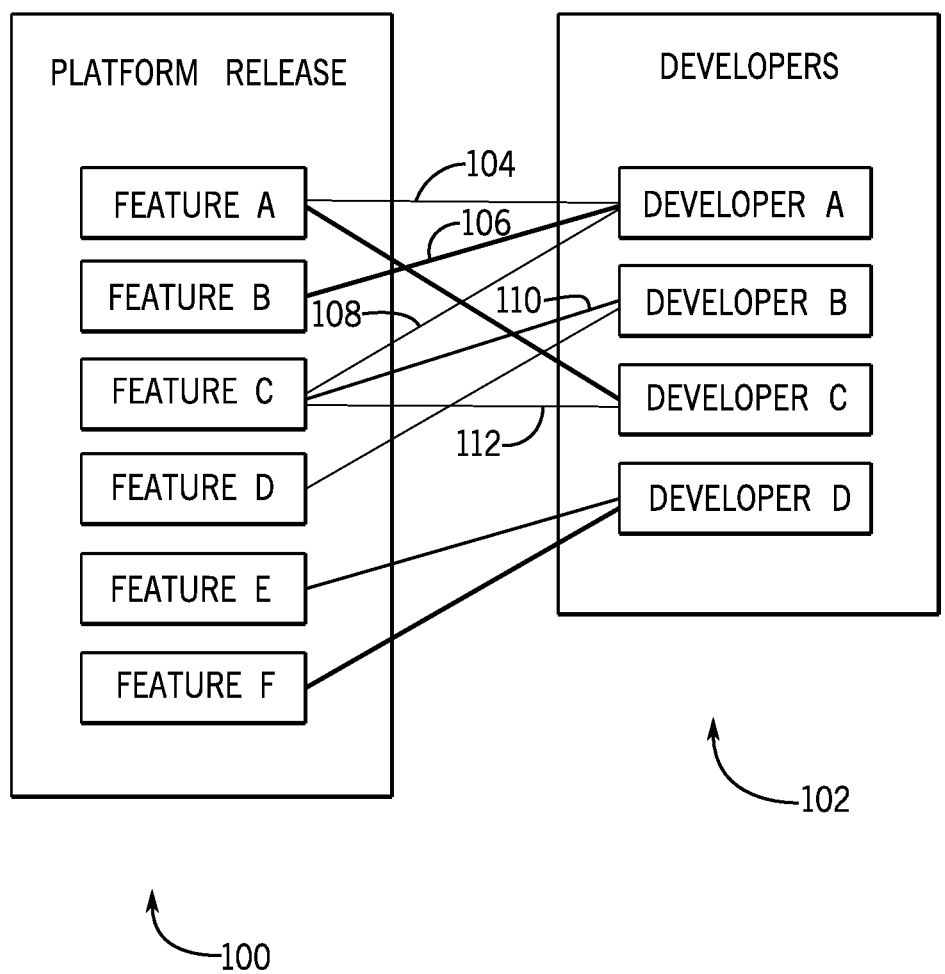
FIG. 4 is a schematic diagram that illustrates logical relationships between a group of features and a group of developers, in accordance with aspects of the present technique.

As set forth above, present embodiments are directed toward improving awareness and implementation of new feature of a software platform release. With this in mind, the presently disclosed developer exchange system is designed to construct, store, and query relationships between features and developers based on developer progress though mission-related training activities associated with these features. For example, FIG. 4 is a schematic diagram that illustrates logical relationships between a group of features 100 (e.g., Features A, B, C, D, E, and F) associated with the platform release and a group of developers 102 (e.g., Developers A, B, C, and D) that may be generated and used by the disclosed system, in certain embodiments. In particular, the platform release may be a release of a new version of software that is part of the cloud platform 20 discussed above. As such, the features 100 may represent new features (e.g., new objects, properties, methods, application programming interfaces (APIs), services, etc.) that are associated with the cloud platform 20 to support and enable the client instance 42 discussed above. As discussed, clients may seek to have applications designed for operation within the client instance 42 that utilize a subset of the new features 100, and may want to identify developers that are qualified to build such applications.

The example illustrated in FIG. 4 visually depicts a level of confidence that a particular developer is qualified to build applications for use within a client instance that include (e.g., utilize, implement) a particular feature. As discussed, the level of confidence is based upon each developer's progress toward completing mission-related activities that correspond to each feature. As illustrated, lines of varying width connect particular features to particular developers, wherein wider lines represent a stronger or greater confidence that the developer is able to develop applications using the indicated feature. For example, the width of the connection 104 between "Developer A" and "Feature A" is substantially less than a width of the connection 106 between "Developer A" and "Feature B." As discussed below, for the illustrated example, the relatively wider connection 106 (and corresponding higher confidence score) indicates that "Developer A" has progressed through a more substantial portion (e.g., a greater number and/or more highly weighted portion) of mission-related activities associated with "Feature B" than of mission-related activities associated with "Feature A" or "Feature C." By way of further example, while all three of "Developer A", "Developer B", and "Developer C" have progress through a certain amount of the mission-based activities with respect to "Feature C," as indicated by connections 108, 110, and 112, respectively, "Developer B" has progressed through a more substantial portion (e.g., a greater number and/or more highly weighted portion) of mission-related activities associated with "Feature C."

Figure 5:
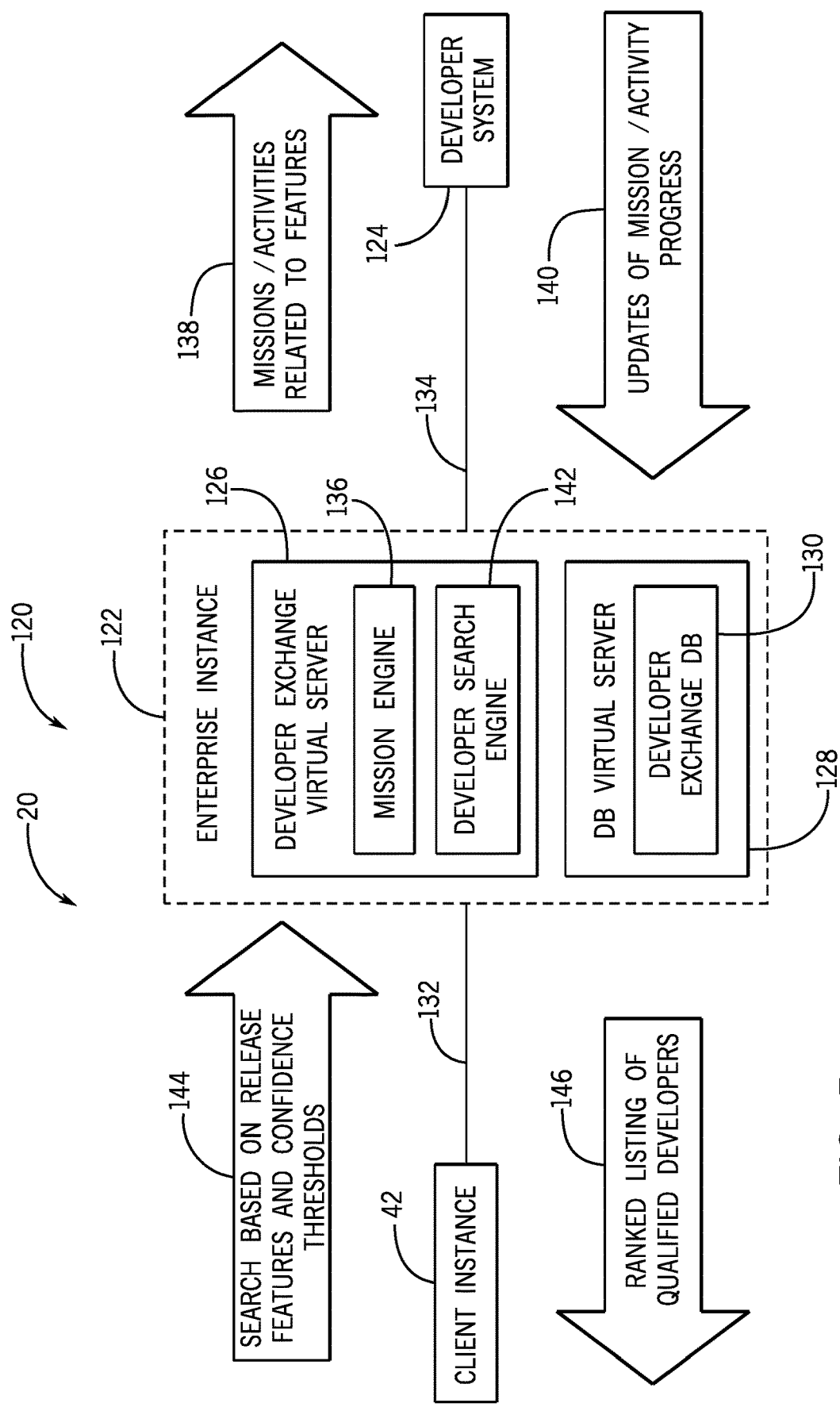
FIG. 5 is a schematic of a developer exchange system that tracks developer progress through mission-related activities, and that enables clients to search for qualified developers based on this tracked developer progress, in accordance with embodiments of the present technique.

FIG. 5 is a schematic of a developer exchange system 120, in accordance with embodiments of the present technique. The developer exchange system 120 of FIG. 5 enables the construction, storage, and querying of the logical relationships between features 100 and developers 102 illustrated in FIG. 4. That is, the developer exchange server 120 enables the determination of developer confidence scores based on developers' achieved progress through mission-related activities that are associated with a particular feature. The illustrated embodiment of the developer exchange system 120 includes an enterprise instance 122 that is communicatively coupled to the client instance 42 and to a developer system 124. The enterprise instance 122 includes a developer exchange virtual server 126 (also referred to herein as developer exchange server), which may be part of one or more virtual servers associated with the enterprise instance 122. For the illustrated embodiment, the developer exchange server 126 is associated with a database virtual server 128 that hosts a developer exchange database 130, as discussed in greater detail with respect to FIG. 6.

More specifically, the developer exchange system 120 illustrated in FIG. 5 is an example of a portion of a service provider cloud infrastructure, including the cloud-based platform 20 discussed above. The cloud-based platform 20 hosts the client instance 42 and the enterprise instance 122, which may be hosted by locally connected physical servers (e.g., within a common data center), or may be hosted by different data centers 22 in communication with one another via a suitable network connection 132 (e.g., via the network 18, the MID server 17, and/or the edge device 16). Both the client instance 42 and the enterprise instance 122 are supported by one or more virtual servers similar to those explained with respect to FIG. 2, and are illustrated here to show support for the disclosed functionality described herein with respect to the developer exchange system 120. The developer system 124 is a computing system (e.g., computing system 80 of FIG. 3) that is operated by or on behalf of a developer and that communicates with the enterprise instance 122 via a suitable network connection 134 (e.g., via the network 18 of FIG. 1).

The illustrated embodiment of the developer exchange server 126 includes a mission engine 136 that is designed to exchange data with the developer system 124. In particular, for the illustrated embodiment, the mission engine 136 is designed to provide missions-related activities 138 pertaining to release features to the developer system 124. Additionally, the illustrated mission engine 136 is also designed to receive updates 140 from the developer system 124 regarding progress of developers through these missions-related activities, and to store information in the developer exchange database 130 based on these updates, as discussed in greater detail below.

The illustrated embodiment of the developer exchange server 126 also includes a developer search engine 142 that is designed to exchange data with the client instance 42. As discussed, the developer search engine 142 is designed to provide a suitable interface to a user of the client instance 42 to enable the user to submit a search request 144 to the developer search engine 142 that identifies one or more release features and one or more corresponding confidence thresholds. In reply, the developer search engine 142 is designed to return, to the client instance 42, a ranked listing of qualified developers 146 that meet the identified parameters based on stored information in the developer exchange database 130 related to developer progress toward completing mission-related activities corresponding to these features.

Figure 6:
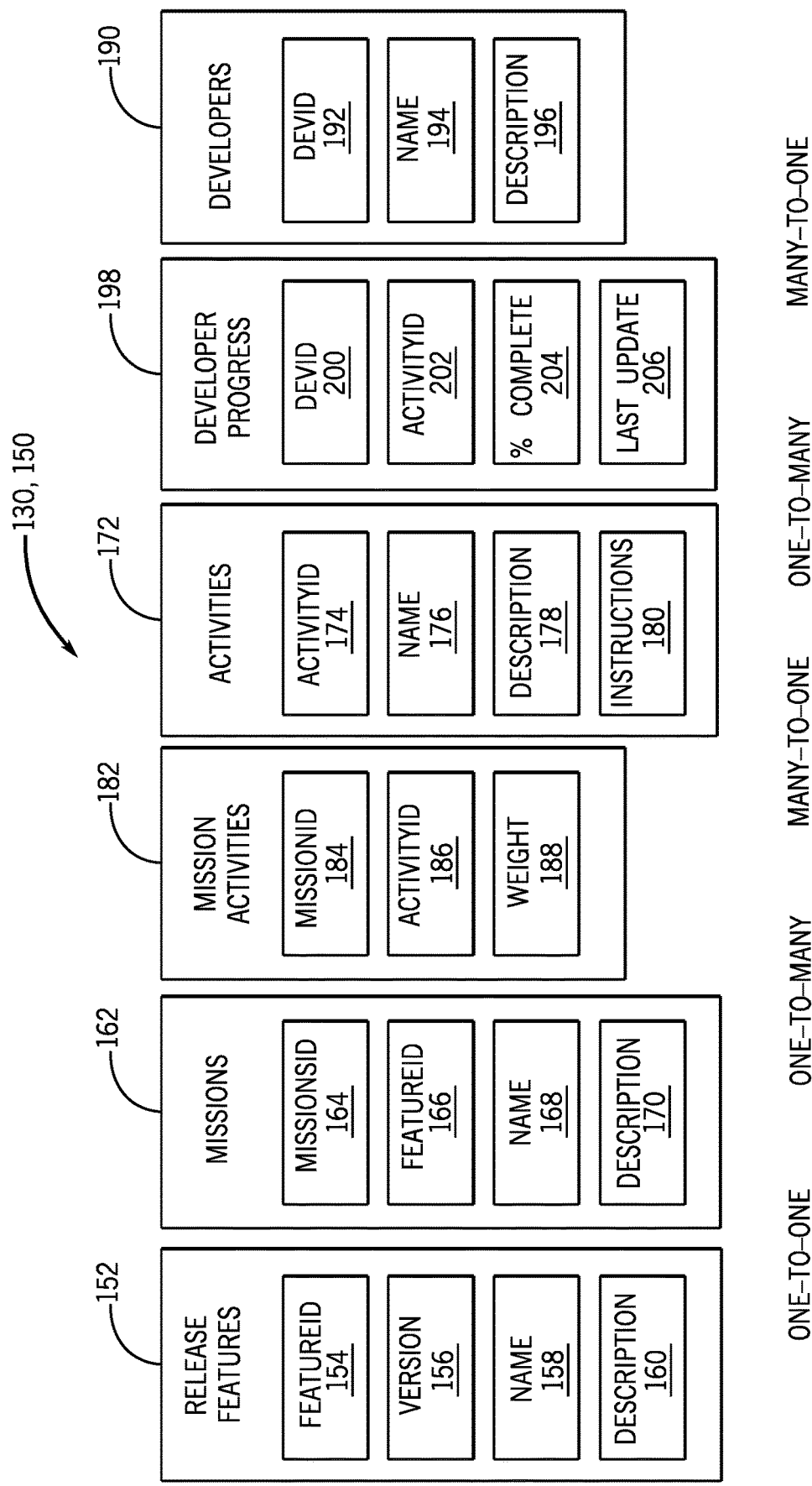
FIG. 6 is a schematic diagram illustrating a developer exchange database storing data related to features, missions, activities, developers, and developer progress through these activities, in accordance with embodiments of the present technique.

FIG. 6 is a schematic diagram illustrating a combination of data structures that may be used to store data related to features, missions, activities, developers, and developer progress through these activities, in accordance with an embodiment. More specifically, FIG. 6 illustrates portions of an example of the developer exchange database 130. The illustrated developer exchange database 130 includes a number of relational database tables 150 storing data to support and enable the operation of the developer exchange server 126. It should be noted that the illustrated database tables are merely provided as an example, and that in other embodiments, other data structures or relational database table structures may be used, in accordance with the present disclosure. For example, in other embodiments, the relational database tables 150 may include additional fields, fewer fields, or different fields than illustrated, and may have different relationships (e.g., one-to-one, one-to-many, many-to-one) than the example illustrated in FIG. 6.

The relational database tables 150 of the example developer exchange database 130 illustrated in FIG. 6 include a "Release Features" table 152 that is designed to store information regarding features of a software platform release. As such, the "Release Features" table 152 includes a "FeatureID" field 154 that serves as a primary key to uniquely identify each release feature stored in the table. The illustrated embodiment of the "Release Features" table 152 includes a "Version" field 156 that stores a value indicative of the software release in which the software feature is introduced, a "Name" field 158 that stores the name of the feature as a string, and a "Description" field 160 that stores a textual description of the feature. In other embodiments, the "Release Features" table 152 may include other fields storing other suitable information regarding the release features (e.g., an estimated impact value field, a deprecated status field).

For the illustrated embodiment, the "Release Features" table 152 has a one-to-one relationship with a "Missions" table 162 that is designed to store information regarding missions. As such, for the illustrated example, each feature release stored in the "Release Features" table 152 corresponds to one particular mission in the "Missions" table 162. The illustrated embodiment of the "Missions" table 162 includes a "MissionID" field 164 that serves as a primary key to uniquely identify each mission stored in the table, and a "FeatureID" field 166 that serves as a foreign key to uniquely identify a feature in the "Release Features" table 152. The "Missions" table 162 also includes a "Name" field 168 that stores the name of the mission as a string, and a "Description" field 170 that stores a textual description of the mission. In other embodiments, the "Missions" table 162 may include other fields storing other suitable information regarding the missions (e.g., an expected difficulty value, estimated time to complete).

The relational database tables 150 illustrated in the example developer exchange database 130 illustrated in FIG. 6 also include an "Activities" table 172 that is designed to store information related to activities. The illustrated embodiment of the "Activities" table 172 includes an "ActivityID" field 174 that serves as a primary key to uniquely identify each activity stored in the table, a "Name" field 176 that stores a name of the activity as a string, and a "Description" field 178 that stores a textual description of the activity. Additionally, the "Activities" table 172 includes an "Instructions" field 180 that includes one or more computer-executable instructions, when executed by a suitable computing system (e.g., the developer exchange system 126, the developer system 124, or a combination thereof, as illustrated in FIG. 5), present the activity to the developer. In other embodiments, the "Activities" table 172 may include other fields storing other suitable information regarding the activities (e.g., an expected difficulty value, estimated time to complete).

For the illustrated embodiment, a particular activity may be associated with multiple missions. As such, in FIG. 6, the "Missions" table 162 and the "Activities" table 172 are related to one another via a "Mission Activities" table 182, which generally stores relationships between missions and activities in the example developer exchange database 130. For the illustrated embodiment, the "Missions" table 162 and the "Activities" table 172 each have respective one-to-many relationships with the "Mission Activities" table 182. To with, the "Mission Activities" table 182 includes a "MissionID" field 184 that serves as a foreign key to uniquely identify a mission in the "Missions" table 162, as well as an "ActivityID" field 186 that serves as a foreign key to uniquely identify an activity in the "Activities" table 172. Additionally, the combination of the "MissionID" field 184 and the "ActivityID" field 186 serves as the primary key of the "Mission Activities" table 182, such that each mission is limited to one occurrence of a particular activity. The illustrated "Mission Activities" table 182 also includes a "Weight" field 188 that includes a numeric value indicating the relative weight of a particular activity toward the completion of a particular mission. As such, it may be appreciated that the disclosed relational database design enables a particular activity to be associated with multiple missions, wherein the completion of the activity can be weighted differently toward the completion of each of these missions.

It may be noted that, in certain embodiments, the missions stored in the "Missions" table 162 and/or the activities stored in the "Activities" table 172 may be or include human-produced training content. For example, a person may design a mission and related activities based on examples believed to capture the breath and essence of a particular feature. In certain embodiments, some or all of the missions and/or activities may be generated automatically based, for example, on documentation that accompanies the software platform release. Since this documentation often includes examples of using platform features, in certain embodiments, the developer exchange server 126 may automatically generate one or more missions or activities based on this documentation. In other embodiments, the developer exchange server 126 may be capable of analyzing developer applications, identifying examples of feature utilization, and generating missions and/or activities that involve a developer reproducing these examples.

The relational database tables 150 of the example developer exchange database 130 illustrated in FIG. 6 also include a "Developers" table 190 that is designed to store information related to developers. The illustrated embodiment of the "Developers" table 190 includes a "DevID" field 192 that serves as a primary key to uniquely identify each developer stored in the table, a "Name" field 194 that stores a name of the developer as a string, and a "Description" field 196 that stores a textual description of the developer. In other embodiments, the "Developers" table 190 may include other fields storing other suitable information regarding the developer (e.g., a creation time of the developer account, contact information, developer keys).

For the illustrated embodiment, the "Activities" table 172 and the "Developers" table 190 each have a respective one-to-many relationship with a "Developer Progress" table 198 that is designed to store information related to developers progress toward the completion of particular activities. More specifically, the illustrated "Developer Progress" table 198 includes a "DevID" field 200 that serves as a foreign key to uniquely identify developers stored in the "Developers" table 190, as well as an "ActivityID" field 202 that serves as a foreign key to uniquely identify activities stored in the "Activities" table 172. Additionally, the combination of the "DevID" field 200 and the "ActivityID" field 202 serves as the primary key of the "Developer Progress" table 198, such that each developer is limited to one record of progress with respect to a particular activity. The illustrated embodiment of the "Developer Progress" table 198 includes a "% Complete" field 204 that stores a numeric value indicating an amount of the particular activity that has been completed by the particular developer. The "Developer Progress" table 198 also includes a "Last Update" field 206 that stores a time stamp of the last time that the particular developer's progress on the particular activity was updated.

In certain embodiments, when a client instance submits a search for developers that are qualified with respect to a particular release feature, the developer exchange database 130 may be queried to determine which developers have suitably completed a sufficient number of activities to be considered qualified to develop applications using this release feature. That is, the developer exchange database 130 may be queried using one or more "FeatureID" values, and the developer exchange database 130 responds, based on the relationships indicated above, by providing information from the "Developers" table 190 for developers that have progressed through a sufficient number of activities related to missions that correspond to the indicated "FeatureID" values to satisfy the demands of the client search. In certain embodiments, the search request 144 may include a respective confidence threshold for each release feature, and information may be returned for developers when the combined "Weight" field values of the activities that are completed by the developer, and that correspond to the mission/release feature, exceeds the respective confidence threshold.

Figure 7:
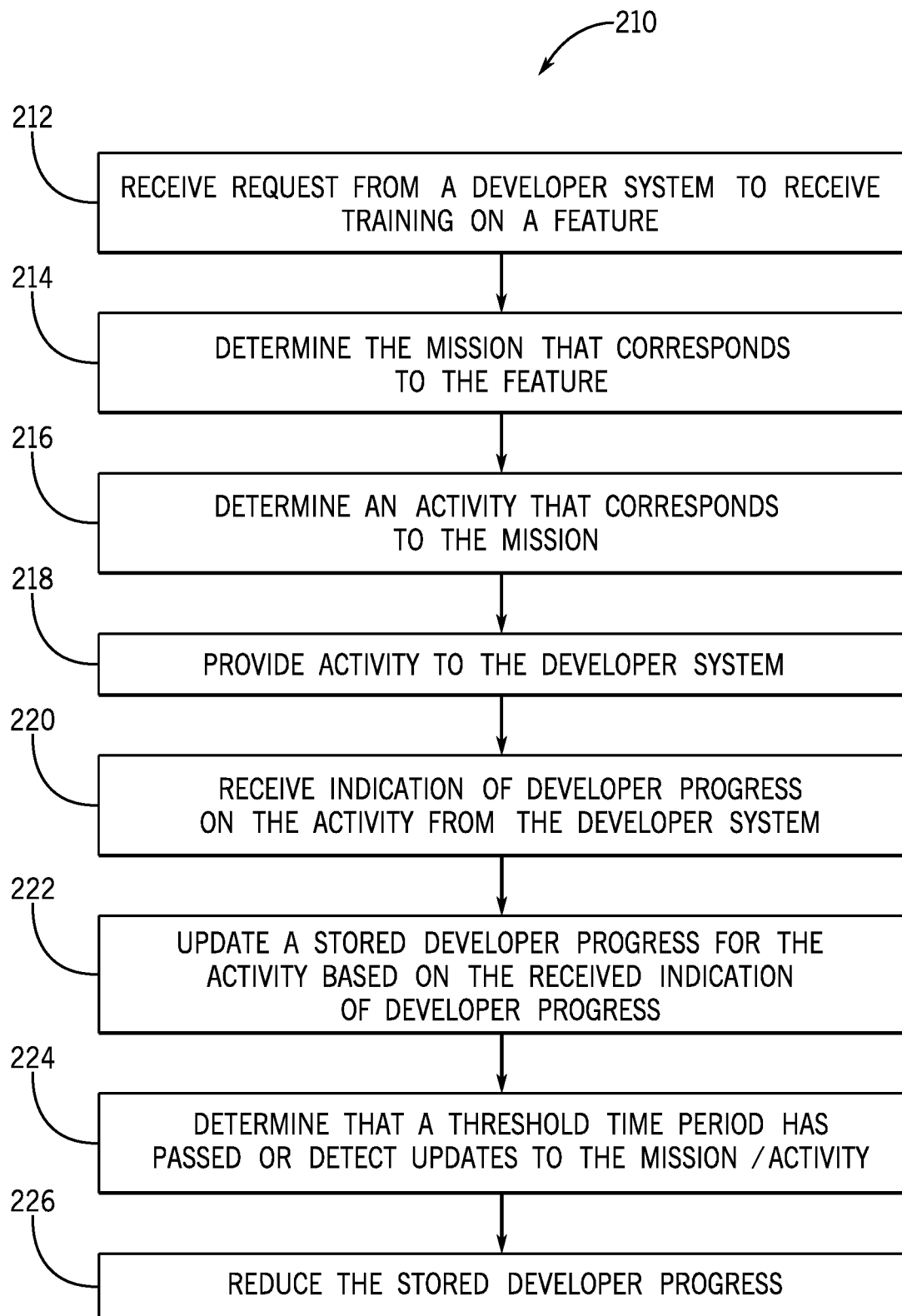
FIG. 7 is a flow diagram illustrating a process whereby the developer exchange server provides mission-related activities to a developer system and receives updates regarding developer progress toward completion of these activities, in accordance with embodiments of the present technique.

FIG. 7 illustrates an embodiment of a process 210 whereby the developer exchange server 126 provides mission-related activities 138 to the developer system 124 and receives updates 140 regarding developer progress toward completion of these activities, as shown in FIG. 5. The process 210 illustrated in FIG. 7 may be stored in any suitable memory (e.g., memory 86) and executed by any suitable processor (e.g., processor 82) of the computing system 80 discussed above. It should be appreciated that the illustrated process 210 is merely provided as an example, and in other embodiments, the process 210 may include different steps, fewer steps, additional steps, or repeated steps, relative to the example of FIG. 7.

For the embodiment illustrated in FIG. 7, the process 210 begins with the developer exchange server 126 receiving (block 212) a request to receive training on a feature. For example, the developer exchange server 126 may first provide the developer system 124 with a list of new features that correspond to a software platform release, and from this list, the developer may respond by identifying a particular feature. In certain embodiments, the developer exchange server 126 may provide the developer system 124 with indications of which features are more important to clients or in higher demand by clients based on searches performed by the clients to locate developers, as discussed below with respect to FIG. 8.

After receiving the request, the developer exchange server 126 responds by determining (block 214) the mission that corresponds to the feature identified in the request, determining (block 216) an activity that corresponds to the feature identified in the request, and providing (block 218) the activity to the developer system 124. For example, in certain embodiments, the developer exchange server 126 determines a next activity in an ordered series of activities that are associated with the mission determined in block 214. In other embodiments, the developer exchange server 126 determines an activity associated with a particular mission or feature that has not been completed by the developer and that has a highest relative weight. In other embodiments, the developer exchange server 126 may determine a last uncompleted activity attempted by the developer that corresponds to the mission determined in block 214 and the feature indicated in block 212.

Continuing through the illustrated embodiment of the process 210, after providing the activity, the developer exchange server 126 receives (block 220), from the developer system 124, an indication of developer progress on the activity. In response, the developer exchange server 126 updates a stored developer progress for the activity based on the received indication of developer progress. For example, the developer exchange server 126 may receive an message indicating that the developer has completed the activity, and may update the corresponding record in the "Developer Progress" table 198 illustrated in FIG. 6 to indicate that the developer has a completed this activity. Alternatively, the developer exchange server 126 may receive a message indicating that the developer has only completed a fractional portion (e.g., 25%, 50%, 75%) of the activity, and the developer exchange server 126 may update the "Developer Progress" table 198 to indicate that the developer has the indicated percent completion for this activity.

Additionally, it may be appreciated that the stored developer progress, which is related to the confidence score discussed below, may decrease over time, in certain embodiments. For example, in certain embodiments, when a predetermined threshold time (e.g., 6 months, 1 year, 3 years) has passed since the developer completed the activity, then the percent completion may be reduced. In certain embodiments, the reduction may be proportional to the amount of time that has passed since the developer completed the activity. In another example, in certain embodiments, when the content of an activity is updated, then the developers that completed the activity prior to the update may be granted a partial percent completion (e.g., 50%) based on the amount of the activity that was changed by the update. It may be appreciated that this provides incentives for developers to periodically repeat previously attempted activities to maintain a high confidence score, which helps to ensure that developers remain skilled in utilizing features of the platform.

It is also envisioned that some or all of the developer exchange database 130 may be partially or entirely populated in other manners. For example, in certain embodiments, to initially populate or update the contents of the developer exchange database 130 regarding existing features of the software platform, the developer exchange server 126 includes a component (e.g., an application-activity analyzer) that is designed to analyze an application produced by a developer and determine, based on the features utilized in the application, that the developer has made progress toward (or has earned credit toward) the completion one or more activities. That is, the developer exchange server 126 may compare software features utilized in the developer's application to determine whether (and to what degree) these correspond to activities stored in the developer exchange database 130, and assign partial or total credit of completing the activity based on this comparison. In certain embodiments, the developer exchange database 130 could be populated for existing features of the software based on applications produced by the developer.

Figure 8:
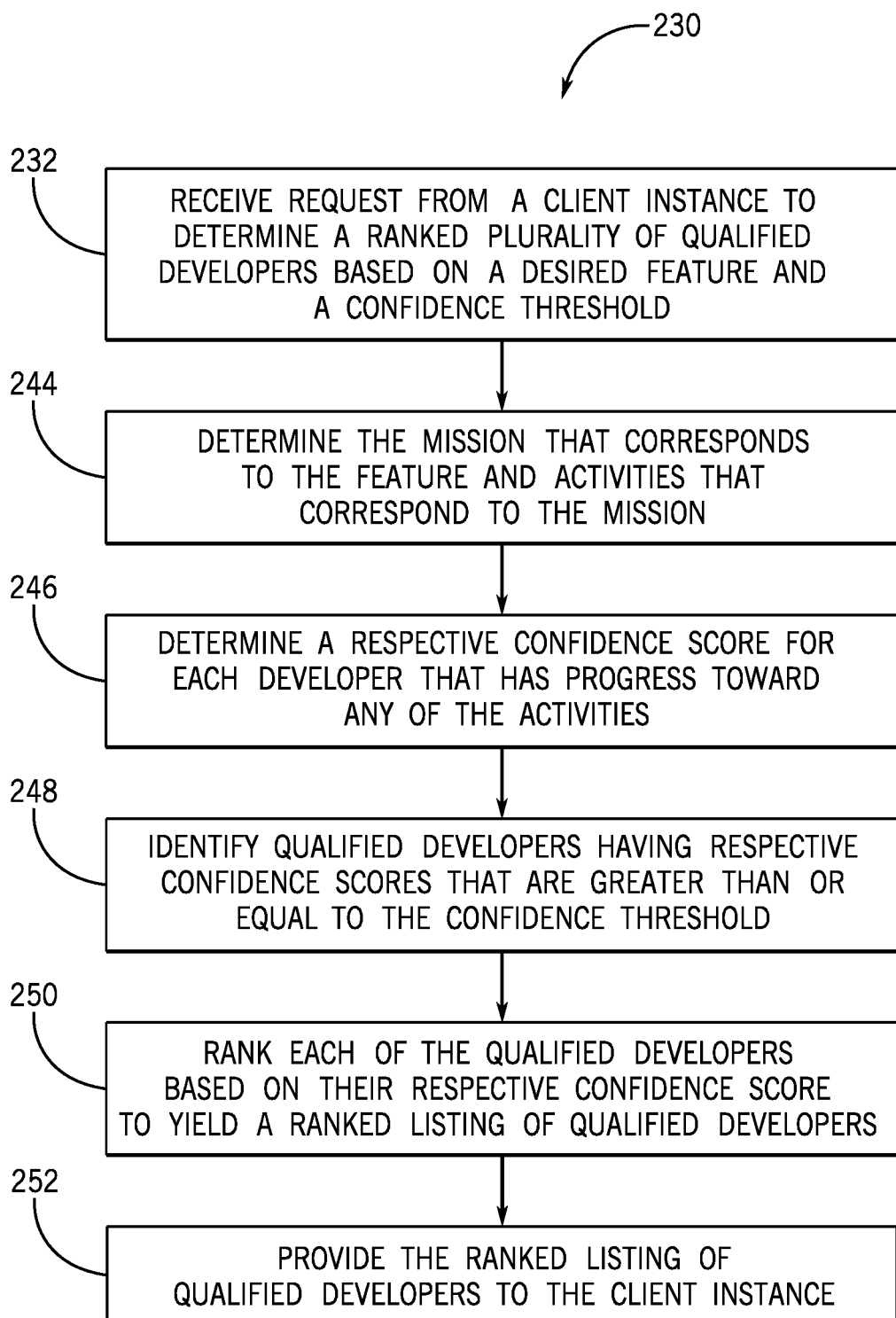
FIG. 8 is a flow diagram illustrating a process whereby the developer exchange server generates and provides a ranked listing of qualified developers in response to a client search request, in accordance with embodiments of the present technique.

FIG. 8 illustrates an embodiment of a process 230 whereby the developer search engine 142 of the enterprise instance 122 generates and provides the ranked listing of qualified developers 146, as shown in FIG. 5. As such, the process 230 of FIG. 8 may be stored in any suitable memory (e.g., memory 86) and executed by any suitable processor (e.g., processor 82) of the computing system 80. It should be appreciated that the illustrated process 230 is merely provided as an example, and in other embodiments, the process 230 may include different steps, fewer steps, additional steps, or repeated steps, relative to the example of FIG. 8. Additionally, for simplicity, the illustrated embodiment of the process 230 describes a search that indicates a single feature (e.g., a single "FeatureID") and a single corresponding confidence score.

The embodiment of the process 230 illustrated in FIG. 8 begins with the developer exchange server 126 receiving (block 232) the search request 144 from the client instance 42 to determine the ranked listing of qualified developers 146 based on a desired feature and a confidence threshold. For example, in an embodiment, the search request 144 includes an array of "FeatureID" values, and a corresponding array of numeric confidence threshold values. In certain embodiments, when a corresponding confidence threshold value is not provided with respect to a particular feature, the developer exchange server 126 may interpret this as searching for 100% confidence threshold or as a default confidence threshold value (e.g., in the "Release features" table 152 of the developer exchange database 130 of FIG. 6) that is associated with the particular feature.

Figure 9:
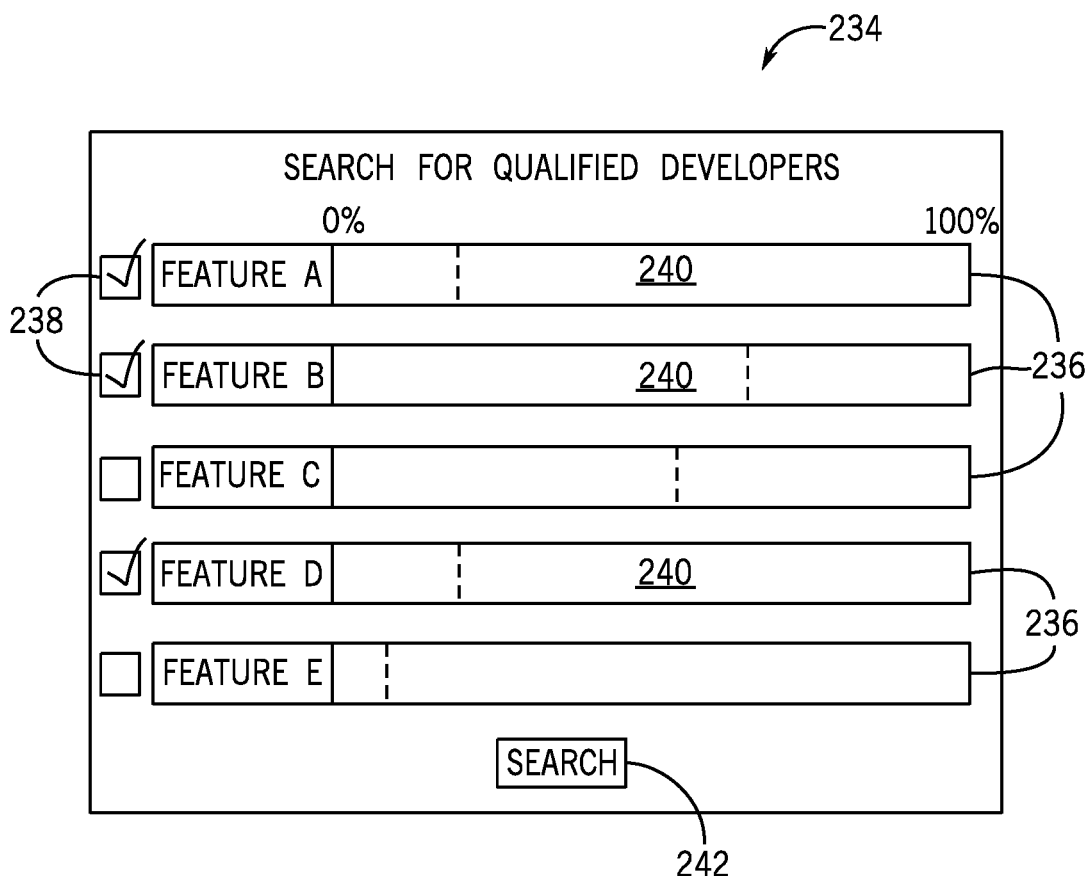
FIG. 9 is a simulated screenshot of a graphical user interface (GUI) designed to enable a user of the client instance to prepare the search request indicating one or more features and one or more corresponding confidence thresholds, in accordance with embodiments of the present technique.

FIG. 9 is a simulated screenshot of a graphical user interface (GUI) 234 designed to enable a user of the client instance 42 to prepare the search request 144 for the ranked listing of qualified developers based on desired features and their corresponding confidence thresholds. The GUI 234 illustrated in FIG. 9 includes a number of rows 236, each indicating a particular release feature (e.g., "Feature A", "Feature B", and so forth). Each of the rows 236 includes a respective check box 238 that enables the user to select or deselect a particular feature to be included in the search, wherein features that are not selected may be visually distinguished (e.g., a different color or level of transparency), as illustrated in FIG. 9. Additionally, once a respective check box 238 is selected, the user may interact with the respective slider bar 240 of a particular row to adjust a desired confidence threshold value to a value ranging from 0% and 100% for each of the corresponding feature. In certain embodiments, the order of the rows 236 may establish a relative importance of each feature, and may be adjusted by the user of the client instance 42 (e.g., in a drag-and-drop manner). In other embodiments, the selection of features, confidence thresholds, and/or relative importance of the features may be received from the user via other user interface elements, in accordance with the present disclosure. Once the user has selected the desired features and set the desired confidence thresholds, then the user may select the "Search" button 242, which causes the client instance 42 to submit the search request 144 to the developer search engine 142 of the developer exchange server 126 of the enterprise instance 122, as illustrated in FIG. 5.

Returning to the embodiment of the process 230 illustrated in FIG. 8, after receiving the search request 144, the developer exchange server 126 determines (block 244) the mission that corresponds to the desired feature, and determines activities that correspond to the mission. For example, the developer exchange server 126 may query the developer exchange database 130 to determine which mission in the "Missions" table 162 corresponds to the "FeatureID" received in block 232, and which activities in the "Activities" table 172 correspond to the mission, as illustrated in FIG. 6. It should be appreciated that, while expanded to demonstrate the underlying logic, the queries illustrated in block 244, as well as subsequent blocks (e.g., blocks 246, 248, and 250), may all be performed in a single query, in certain embodiments.

Subsequently, the developer exchange server 126 determines (block 246) a respective confidence score for each developer that has progress toward any of the activities identified in block 244. In certain embodiments, the developer exchange server 126 may perform this computation in response to an indication of progress from the developer system 124 (or during periodic updates), and then store the result as a field in the developer exchange database 130 that is available for querying. By way of specific example, the "Developers" table 190 of FIG. 6 (or another suitable table) may store information that defines a developer profile for each developer represented in the developer exchange database 130, and each developer profile may include a confidence score (e.g., calculated as set forth above) with respect to certain features of the platform, based on the received indications of progress of each developer through the mission-related activities of these features. In other embodiments, the computation of the respective confidence score may be performed in response to the search request 144 received in block 232. For embodiments that perform appropriate computation to generate the aforementioned developer profiles in advance of receiving the search request 114, it may be appreciated that the developer exchange server 126 consumes fewer processing resources when querying stored respective confidence scores, as opposed to calculating confidence scores "on the fly" in response to the search request 144.

To compute the confidence score, the developer exchange server 126 may query the developer exchange database 130 for each developer that has made at least some progress on at least one of the activities determined in block 244. Turning back to the example of FIG. 6, the developer exchange server 126 may query the "Developer Progress" table 198, as well as the "Mission Activities" table 182, using the "ActivityID" of each of the activities determined in block 244. As such, the developer exchange server 126 may determine a corresponding "% Complete" field 204 and a "Weight" field 188 from these tables for each activity. As such, in certain embodiments, the developer exchange server 126 determines the confidence score for each developer based on one or more of the "% Complete" and/or the "Weight" for each activity. For example, in certain embodiments, the developer exchange server 126 may multiply the "% Complete" value and the "Weight" value for each activity related to the mission, and then sum the products per developer to determine the confidence score of each developer with respect to the feature that corresponds to the mission.

By way of specific example, a particular feature is associated with a particular mission, and the mission is associated with three activities: a first activity having a respective "Weight" value of 50%, a second activity having a respective "Weight" value of 25%, and a third activity a respective "Weight" value of 25%. For this example, a particular developer has completed 75% of the first activity, 50% of the second activity, and 0% of the third activity. As such, in an embodiment, the developer exchange server 126 may determine that the confidence score of the developer with respect to the feature to be: (50%×75%)+(25%×50%)+(50%×0%), or 50%. Furthermore, when more than one feature and corresponding confidence threshold is included in the search request 144, then, in certain embodiments, the developer exchange server 126 may combine the individual confidence scores of each developer with respect all of the features into a single, overall confidence score.

Subsequently, the developer exchange server 126 identifies (block 248) qualified developers that have a respective confidence score that is greater than or equal to the confidence threshold. Accordingly, after determining a respective confidence score for each developer based on progress toward competition of a pertinent activity in block 246, the developer exchange server 126 selects a group of these developers having a respective confidence score that is greater than or equal to the confidence threshold received in block 232. Additionally, the developer exchange server 126 ranks (block 250) (e.g., orders, sorts) the qualified developers based on their respective confidence score to yield a ranked listing of qualified developers.

Figure 10:
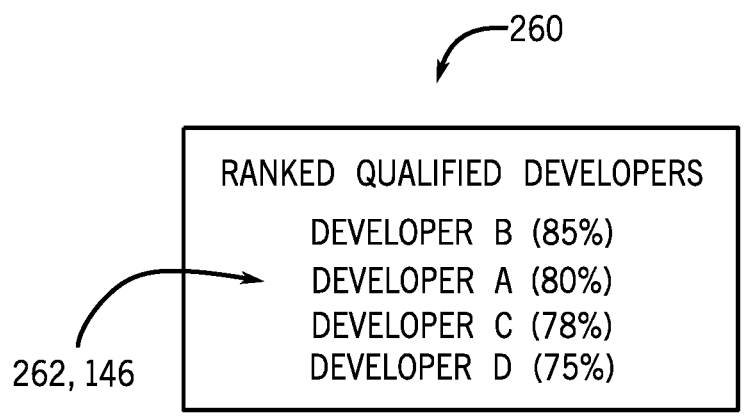
FIG. 10 is a simulated screenshot of a GUI designed to present to the user of the client instance a ranked listing of qualified developers in response to a search request, in accordance with embodiments of the present technique.

Finally, the developer exchange server 126 provides (block 252) the ranked listing of qualified developers 146 to the client instance 42 in response to the search request 144 received in block 232. For example, FIG. 10 is a simulated screenshot of a GUI 260 designed to present to the user of the client instance 42 the ranked listing of qualified developers 146 in response to the request 144 from the client instance 42, as illustrated in FIG. 5. For the example of FIG. 10, the previously submitted search request 144 to the developer exchange server 126 indicated a particular feature (e.g., "Feature A") and a particular corresponding confidence threshold (e.g., 70%). As such, the GUI 260 illustrated in FIG. 10 has a table 262 that includes the ranked listing of qualified developers 146 that is generated according to the process 230 of FIG. 8. The ranked listing of qualified developers 146 includes four developers (e.g., Developers A, B, C, and D), and a respective confidence score for each developer. As such, each of the four developers has a respective confidence score that is greater than the indicated confidence threshold, and the developers are ranked (e.g., #1, #2, #3, #4) based on the relative confidence score of the developers for the particular feature.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:
    storing, in one or more memories, a database comprising a plurality of training activities and a plurality of developer records, wherein the plurality of training activities correspond to features of a software platform, wherein each developer record of the plurality of developer records comprises a score for each of the plurality of training activities;
    updating, via one or more processors, the database to include a new training activity corresponding to a new feature of the software platform, wherein the new training activity comprises documentation associated with the new feature of the software platform, an instructional video corresponding to the new feature, a coding example utilizing the new feature, or a combination thereof;
    updating, via the one or more processors, a first developer record of the plurality of developer records to include a first new score corresponding to the new training activity;
    updating, via the one or more processors, a second developer record of the plurality of developer records to include a second new score corresponding the new training activity;
    receiving, via the one or more processors, a search request that specifies the new feature and at least one additional feature of the features of the software platform; and
    in response to receiving the search request:
        determining, via the one or more processors, a first combined score for the first developer record based at least in part on the first new score and a third score of the first developer record associated with the at least one additional feature;
        determining, via the one or more processors, a second combined score for the second developer record based at least in part on the second new score and a fourth score of the second developer record associated with the at least one additional feature; and
        providing, via the one or more processors, a ranked listing of at least a portion of the plurality of developer records based at least in part on the first combined score and the second combined score, wherein each developer record of the portion of the plurality of developer records in the ranked listing comprises a respective combined score greater than a threshold score.

2. The method of claim 1, comprising:
    receiving, via the one or more processors, a request for the new training activity; and
    in response to receiving the request, transmitting, via the one or more processors, the new training activity.

3. The method of claim 1, comprising:
    receiving, via the one or more processors, an indication of progress concerning the new training activity corresponding to the first developer record; and
    determining, via the one or more processors, the first new score based at least in part on the indication of progress.

4. The method of claim 3, wherein the indication of progress comprises an indication of full completion of the new training activity.

5. The method of claim 3, comprising updating, via the one or more processors, the first new score based at least in part on an amount of time that has passed since the indication of progress has been received.

6. The method of claim 1, comprising:
    receiving, via the one or more processors, a request for the new training activity from a developer system, wherein the developer system corresponds to a third developer record of the plurality of developer records; and
    transmitting, via the one or more processors, the new training activity to the developer system.

7. The method of claim 1, comprising selecting, via the one or more processors, qualified developer records from the ranked listing, wherein of the respective combined score of each of the qualified developer records is greater than the threshold score.

8. The method of claim 1, wherein the database is stored on a cloud computing platform, the search request is received from a client instance of the cloud computing platform, and the ranked listing is provided to the client instance in response to the search request.

9. The method of claim 8, comprising receiving, via the one or more processors, an indication of progress corresponding to the new training activity, wherein the indication of progress is received from a developer system communicatively coupled to the cloud computing platform and associated with the first developer record, and wherein the first new score is based at least in part on the indication of progress.

10. A non-transitory, computer-readable storage medium storing instructions executable by a processor of a computer system, wherein the instructions comprise instructions to:
store a database comprising a plurality of training activities and a plurality of developer records, wherein the plurality of training activities correspond to features of a software platform, and wherein each developer record of the plurality of developer records comprises a score for each of the plurality of training activities;
update the database to include a new training activity corresponding to a new feature of the software platform, wherein the new training activity comprises documentation associated with the new feature of the software platform, an instructional video corresponding to the new feature, a coding example utilizing the new feature, or a combination thereof;
update one or more developer records of the plurality of developer records to include one or more respective scores corresponding to the new training activity;
receive a search request comprising a set of features of the software platform, wherein the set of features specifies the new feature; and
in response to receiving the search request, determine a ranked listing of at least a portion of the plurality of developer records, wherein determining the ranked listing comprises:
determining respective weights associated with training activities corresponding to the set of features;
determining, for each developer record of the plurality of developer records, respective scores associated with the training activities corresponding to the set of features; and
determining a respective combined score for each developer record of the plurality of developer records by combining the respective scores associated with the training activities corresponding to the set of features for each developer record of the plurality of developer records based at least in part on the respective weights associated with the training activities corresponding to the set of features, wherein the ranked listing comprises a set of developer records, wherein the respective combined score for each developer record of the set of developer records is greater than a threshold score.

11. The storage medium of claim 10, wherein the instructions comprise instructions to:
analyze an application associated with a first developer record of the plurality of developer records, wherein the application utilizes the new feature; and
update a first new score of the first developer record corresponding to the new training activity based on analyzing the application.

12. The storage medium of claim 10, wherein the instructions comprise instructions to:
provide the new training activity to a developer system associated with a first developer record of the plurality of developer records;
receive an indication of progress associated with the provided new training activity; and
determine a first new score for the first developer record based on the indication of progress.

13. A system, comprising:
one or more memory structures storing a database that comprises a plurality of training activities and a plurality of developer records, wherein the plurality of training activities correspond to features of a software platform, and wherein each developer record of the plurality of developer records comprises a score for each of the plurality of training activities; and
one or more processors configured to execute instructions stored in the one or more memory structures to cause the system to perform actions comprising:
updating the database to include a new training activity corresponding to a new feature of the software platform, wherein the new training activity comprises documentation associated with the new feature of the software platform, an instructional video corresponding to the new feature, a coding example utilizing the new feature, or a combination thereof;
updating a first developer record of the plurality of developer records to include a first new score corresponding to the new training activity;
updating a second developer record of the plurality of developer records to include a second new score corresponding the new training activity;
receiving a search request that specifies a set of features of the software platform, wherein the set of features comprises the new feature and at least one additional feature of the features of the software platform; and
in response to the search request:
determining, via the one or more processors, a first combined score for the first developer record based at least in part on the first new score and a third score of the first developer record associated with the at least one additional feature;
determining, via the one or more processors, a second combined score for the second developer record based at least in part on the second new score and a fourth score of the second developer record associated with the at least one additional feature; and
determining a ranked listing of at least a portion of the plurality of developer records based at least in part on the first combined score and the second combined score, wherein each developer record of the portion of the plurality of developer records in the ranked listing comprises a respective combined score greater than a threshold score.

14. The system of claim 13, wherein the actions comprise:
receiving an indication of progress corresponding to the first developer record, wherein the indication of progress comprises a percent completion of the new training activity; and
determining the first new score based at least in part on the indication of progress.

* * * * *